United States Patent [19]

Knowles

[11] Patent Number: 4,930,848
[45] Date of Patent: Jun. 5, 1990

[54] PORTABLE LASER SCANNER WITH INTEGRAL SCANNER ENGINE

[75] Inventor: Carl H. Knowles, Moorestown, N.J.

[73] Assignee: Metrologic Instruments, Inc., Bellmawr, N.J.

[21] Appl. No.: 303,376

[22] Filed: Jan. 26, 1989

[51] Int. Cl.⁵ .................. G02B 26/10; G06K 7/10
[52] U.S. Cl. .................... 350/6.6; 235/467; 235/472
[58] Field of Search .............. 350/6.5, 6.6, 618, 622; 235/462, 467, 472

[56] References Cited

U.S. PATENT DOCUMENTS

| | | | |
|---|---|---|---|
| D. 281,977 | 12/1985 | Sklaroff | D14/116 |
| 4,349,843 | 9/1982 | Laakmann et al. | 350/6.6 |
| 4,387,297 | 6/1983 | Swartz et al. | 235/462 |
| 4,409,470 | 10/1983 | Shepard et al. | 235/472 |
| 4,460,120 | 7/1984 | Shepard et al. | 235/472 |
| 4,575,625 | 3/1986 | Knowles | 235/467 |
| 4,607,156 | 8/1986 | Koppenaal et al. | 235/472 |
| 4,760,248 | 7/1988 | Swartz et al. | 235/472 |
| 4,762,994 | 8/1988 | Byerly et al. | 350/6.6 |

OTHER PUBLICATIONS

Metrologic MS123 Laser Data Terminal, Apr. 1981.
Metrologic MS131 Laser Scanning Head, Copyright 1984, printed Sep. 1984.

*Primary Examiner*—Bruce Y. Arnold
*Assistant Examiner*—Ronald M. Kachmarik
*Attorney, Agent, or Firm*—Caesar, Rivise, Bernstein, Cohen & Pokotilow, Ltd.

[57] ABSTRACT

A hand held laser scanner including a housing comprising a hand-grip portion and a body portion. The body portion is hollow and includes a self-contained laser scanner module releasable secured therein. The module is housed within a enclosure having a window, and comprises a source of laser light, a mechanism for sweeping the laser beam within the enclosure to produce a scan pattern comprising at least one line, a reflective beam folding system for projecting the pattern out of the window and onto an object, such as a bar code, and a system for receiving light reflected off the object to convert the reflected light into an electrical signal indicative thereof. The beam sweeping mechanism comprises an oscillating reflective member. The reflective beam folding system comprises at least two mirrors disposed generally opposite each other to receive the beam of light from the beam sweeping mechanism and to fold its path by reflecting it back and forth within the enclosure. The module includes an output conductor for carrying signals from it which are indicative of the bar code scanned to decoding means located within a hollow cavity in the housing's hand-grip portion.

20 Claims, 1 Drawing Sheet

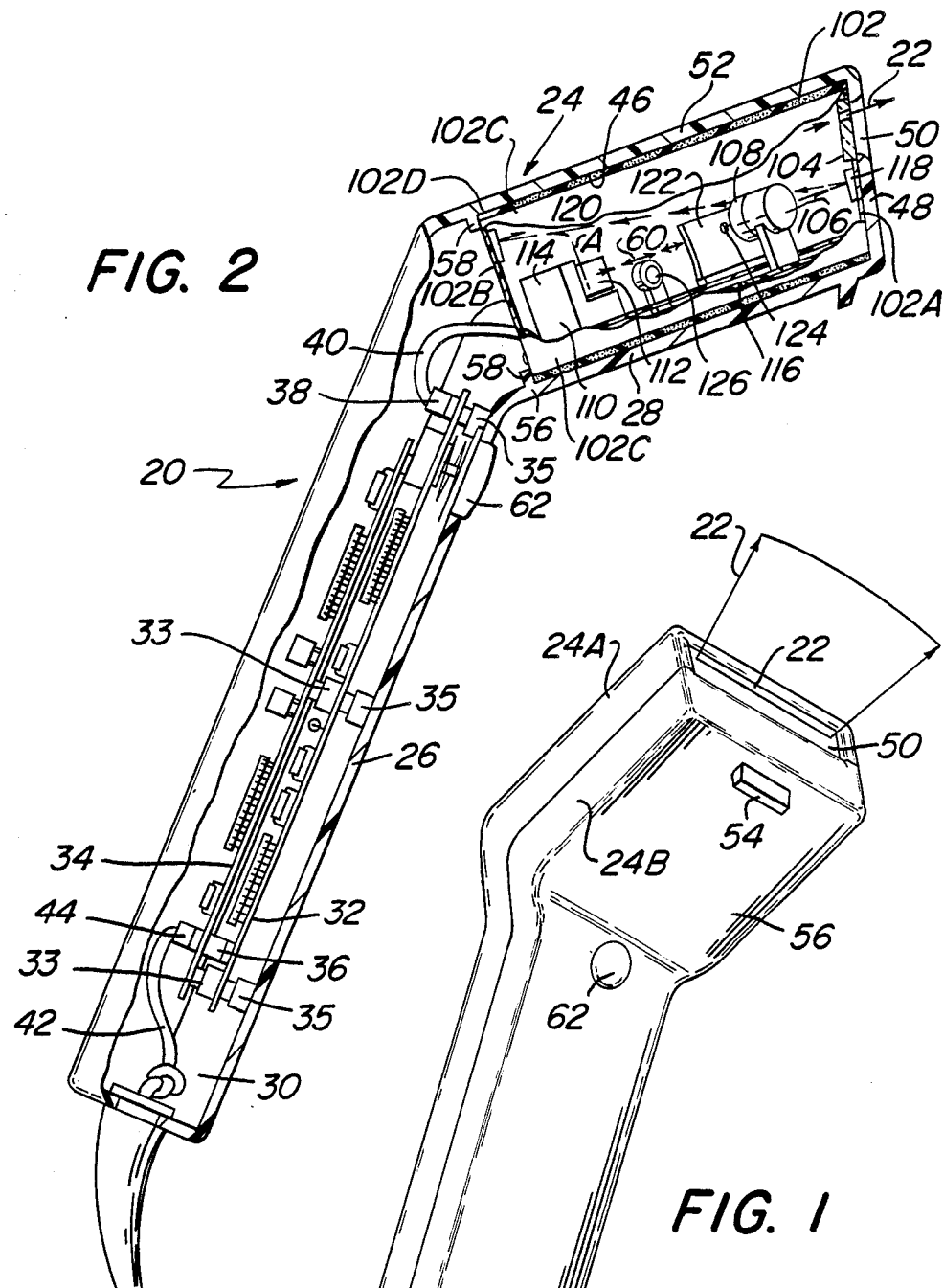

PORTABLE LASER SCANNER WITH INTEGRAL SCANNER ENGINE

BACKGROUND OF THE INVENTION

This invention relates generally to laser scanning apparatus and more particularly to compact, self-contained laser scanners.

Various hand-held, laser scanning apparatus have been disclosed in the patent literature and many are commercially available to read bar codes, e.g., the uniform product code, which is imprinted on packaging for product, or on the product itself or on some other item.

Hand-held scanning devices typically are composed of a relatively small, light weight, scanning head for projecting a scan pattern onto a bar code to read the that code. For example, in U.S. Pat. No. 4,575,625, of which I am the inventor, and which is assigned to the same assignee as this invention, there is disclosed a hand-held laser scanner. That scanner is a completely self-contained unit in that it includes laser scanning means and power supplies, a decoding computer to provide a signal indicative of the information contained in the bar code, and communication capabilities to enable the uploading/ downloading of data to and from the scanner. Thus, the scanner includes, among other things, a laser tube and an associated optic bench assembly. The laser tube produces a laser beam which is directed to a rotating reflective polygon. The polygon is rotated by an associated motor assembly. The laser beam is swept by the rotating polygon through a predetermined arc and is directed out through a window in the housing to sweep across a bar code located opposite the window. A photo detector located within the housing receives the light reflected off of the bar code and converts that light into an electrical signal which is amplified and processed by an associated amplifier and signal processing circuitry, also located within the scanner. The scanner also includes a low voltage power supply, a microprocessor and associated circuitry, a high voltage power supply, a releasable input/output cable connector or plug, an associated input/output cable, and an on/off trigger assembly. The housing for the scanner basically comprises a molded plastic body having a cylindrical hand-grip portion and a finger opening located therebelow. The shape of the housing is shown in U.S. Design Pat. No. D281,977, also assigned to the same assignee as this invention.

In my co-pending U.S. Pat. No. 4,805,175, entitled Ultra Compact, Hand-Held Laser Scanner, which is assigned to the same assignee as this invention, there is disclosed an even more compact hand-held scanner. That scanner basically comprises a laser tube and associated high voltage power assembly (or in an alternative embodiment a semi-conductor laser diode and associated supply and control means), beam folding and sweeping optics, a motor sub-assembly, a photo detector and associated amplification and signal processing circuit sub-assembly, a releasable input/output cable connector or plug, an associated input/output cable, and an on/off trigger assembly, all housed within an extremely compact and ergonomically designed housing. The housing includes a short snout or body portion in which a window through which the laser beam and the reflected light passes, and a supporting, hand-grip portion arranged to be held within the user's hand. The housing's construction enhances the balance point of the device by putting its center of gravity in the operator's hands so that it can be held comfortably for long periods of time without operator fatigue.

In the interest of compactness the device of my co-pending application makes use of an oscillating mirror to effect the scanning or sweeping action of the beam. Thus, in that scanner the beam is directed to an oscillating mirror to sweep the beam through a predetermined arc, with the swept beam being directed straight from the mirror through the short body portion of the housing and out through a window to impinge on a bar code disposed opposite the window.

Examples of other hand-held laser scanners have been disclosed in the following patent literature: U.S. Pat. Nos. 4,387,297 (Swartz et al.), 4,409,470 (Shepard et al), 4,460,120 (Shepard et al.), 4,607,156 (Koppenall et al.) and 4,760,248 (Swartz et al).

While the devices disclosed in the aforementioned prior art all exhibit the characteristic of being compact (to some degree) in the interest of operator ease of use, nevertheless all still leave something to be desired from the standpoint of size.

In my copending U.S. patent application Ser. No. 07/299,998, filed on Jan. 23, 1989, entitled Laser Scanner Engine with Folded Beam Path, which is assigned to the same assignee as this invention and whose disclosure is incorporated by reference herein, there is disclosed and claimed a modular scanning engine which is extremely compact in size and suitable for use in various types of scanning systems.

OBJECTS OF THE INVENTION

Accordingly, it is a general object of this invention to provide a compact, hand-held laser scanner which includes a modular scanner engine constructed in accordance with the teachings of my aforementioned patent application.

It is a further object of this invention to provide a scanning unit which is extremely compact in size and light in weight so that it can be readily held and manipulated by a user.

It is still a further object of this invention to provide an extremely compact hand-held laser scanner which can be readily assembled and disassembled.

It is yet a further object of this invention to provide an extremely compact hand-held scanner which permits the effective reading of symbols either close to or far from the scanner.

SUMMARY OF THE INVENTION

These and other objects of the instant invention are achieved by providing a hand-held laser scanner. The scanner includes a housing having a hand grip portion and a body portion projecting at an angle to said hand grip portion. The body portion includes a chamber in which a scanning module is located. The module is and integral scanning unit which is arranged to be releasably secured within the chamber and includes an enclosure having a window, which when the module is located within the chamber is located at the free end of the body portion. The module also includes means for sweeping a laser beam from a predetermined point within the enclosure through a predetermined angle to produce a scan pattern comprising at least one line, and beam folding means for projecting the scan pattern out of the window. The beam folding means is located between the beam sweeping means and the window and serves to fold the path of the beam within the housing. The module also includes output conductor means for carrying a signal indicative of the symbol scanned to signal decoding means located within the hand-grip portion of the scanner.

DESCRIPTION OF THE DRAWING

FIG. 1 is a side elevational view, partially in section, of a hand-held laser scanner constructed in accordance with the subject invention; and FIG. 2 is a reduced perspective view, partially in section, of the laser scanner shown in FIG. 1.

DETAILED DESCRIPTION OF THE PREFERRED EMBODIMENT

Referring now to various figures of the drawing wherein like reference characters refer to like parts there is shown in FIG. 1 one embodiment 20 of a hand-held laser scanner constructed in accordance with this invention. The scanner 20 is a complete scanning system for reading any bar code held in its scan pattern 22 and for providing decoded output signals indicative of the information contained in the scanned code to any type of peripheral device (not shown), e.g., an electronic cash register, computer, etc.

The device 20 includes a housing 24 defining a hand-grip portion 26 and a body portion 28. The hand-grip portion is generally parallelopiped shape which is sized and configured to be readily held in one's hand by wrapping one's fingers about it. The hand-grip portion includes a spring biased actuating button 30 which when depressed initiates the operation of the scanner (as will be described later). The body portion 26 of the housing is located at the upper end of the hand-grip portion and is also of generally parallelopiped shape (although slightly wider than the hand-grip portion). The body portion extends at an angle to the hand-grip portion in the interests of ergonomics and to facilitate the aiming of the device at a bar code to scan it.

In accordance with a preferred embodiment of this invention the housing 24 is made up of two sections 24A and 24B (FIG. 2), each molded of a plastic material, and which can be readily held together by means (not shown) complete the housing. The hand-grip portion 26 of the housing 24 is hollow and defines a cavity 30 therein. This cavity serves to hold a printed circuit board or card 32 containing the electronic components making up the device's decoder. Preferably such components are surface mount components. The cavity 30 also is arranged to hold another printed circuit board or card 34, such as an interface for connecting the scanner to any suitable peripheral (e.g., cash register, computer, etc.). Preferably the components making up the interface board are also surface mount components.

As can be seen, the card 34 is disposed over the card 32 and is releasably mounted thereon via plural mating male/female mechanical connector sets 33. The card 32 is in turn mounted onto the inner surface of the hand-grip portion, via any suitable releasable mounting means 35. The two circuit cards 32 and 34 are electrically interconnected to each other via conventional electrical connectors 36, and are connected to a scanner module 100 (to be described later) via a similar electrical connector 38 and associated cable 40.

The connection of the scanner 20 to the peripheral device is effected via another cable 42. The cable also serves the usual functions, e.g., to carry the required power to the scanner, etc., and is connected to the printed circuit cards 32 and 34 via an electrical connector 44. All of the connectors are conventional components.

The body portion 28 of the housing 24 is also hollow and defines a cavity 46 therein. It is in cavity 46 that the scanner engine 100 of my aforenoted patent application is located. Before describing that engine, a further description of the housing's body portion 28 is in order. Thus, as can be seen, the free end of the body portion 28 is in the form of a wall 48 having an opening 50 therein. The opening extends across virtually the entire width of the body portion 28 and is located immediately below the housing's top wall 52.

A tab or hook 54 projects downward from the bottom wall 56 of the body portion 28 of the housing. This hook serves as a means form hanging the scanner from some support structure (not shown) when the scanner is not being used. Such action prevents the small and light weight scanner from "wandering" out of easy reach of the user.

As described in my aforenoted application the engine 100 is self-contained within a very compact, e.g., 1 inch by 1.5 inches by 0.75 inch, parallelopiped shaped enclosure 102. The enclosure includes a front wall 102A, a rear wall 102B, a pair of side walls 102C, a top wall 102D, and a bottom wall 102E. The housing is arranged to fit closely within the cavity 46 in the body portion 28 of the housing 24, and is held in place by a pair of ridges or stops 58.

The front wall 102A of the engine 100 includes a rectangularly shaped window 104 extending virtually the entire width of the enclosure 102 and located immediately adjacent its top wall 102D. Thus, when the engine is in place in the cavity 46 its window 104 is located at the opening 50 in the housing 24.

The laser light source and all of the associated optical, mechanical, and electrical components to produce the laser beam scanning pattern 22, to project it out of the window 104 onto a bar code (not shown), and to sense the light reflected off of the bar code to produce the digital output signals, are all located within the engine's enclosure 102. The components forming the laser, its focusing optics, and the electrical components forming the reflected light receiving means and associated signal processing circuitry are conventional, and hence, will only be described generally herein. Thus, the engine 100 comprises a conventional semiconductor laser diode 106 and associated optical means 108. The optical means 108 comprises a lens system, not shown, mounted on the front of the laser diode for focusing the beam produced by the diode into the desired spot size. The focused beam, denoted by the reference numeral 60, is then directed to beam sweeping means 110 which serves to sweep the focused beam through a predetermined arc, about an axis A to produce the scan pattern 22. That pattern consists of a single, straight line when projected onto a plane and extends across substantially the entire width of the window 204.

Moreover, as can be seen in FIG. 1 the line scan pattern 22 exits the window 104 immediately below the housing's top wall 52. The latter feature facilitates the aiming of the pattern onto a bar code since the top of the scanner housing will not block the viewer's line of sight to the scan pattern and, hence the symbol onto which it is projected.

The beam sweeping means 110 incorporated into the engine 110 constitutes yet another invention of mine, and is the subject of copending U.S. patent application Ser. No. 07/300,018, filed on Jan. 23, 1989, entitled Bouncing Oscillating Scanning Device for Laser Scanning Apparatus. That application is assigned to the same assignee as this invention and its disclosure is incorporated by reference herein. As disclosed in that application the beam sweeping means basically comprises light reflective means 112 (e.g., a mirror), a motor (not shown), and a support structure 114.

The motor is preferably an electromagnet which is coupled to the mirror 112 to oscillate it about the axis A through a predetermined arc, e.g., +/−7 degrees, to produce the desired line pattern. In the preferred embodiment the mirror is concave, but can be any other suitable shape, e.g., planar. The mirror 112 is mounted on a pivot arm (not shown) which is pivotally mounted on the support structure 114 at the location of the pivot axis A. The pivot arm includes a permanent magnet mounted at its free end. The electromagnet motor comprises an coil of electrically conductive wire forming a central bore in which the permanent magnet is located. The coil is arranged to be connected to current supply means (not shown) for providing electrical current pulses of opposite polarity to it to produce alternating direction electromagnetic fields. This action causes the magnet to be pulled and pushed into and out of the bore, thereby causing the arm to oscillate about axis A.

The amount of excursion of the magnet into and out of the bore, and hence the angle of the mirror's oscillation about axis A, is established by the use of a pair of adjustable elastic stops or bumpers (not shown). In order to energize the coil a series of respective very short duration current initiation pulses are produced by control means (not shown) each time that the pivot arm has reached the end of its particular excursion. Sensor means (not shown) are provided at each bumper and are coupled to the control means to initiate the production of the current initiation pulses.

The alternate energization of the coil coupled with the operation of the elastic bumpers (e.g., the bumpers stop the excursion of the arm in one direction and due to their resiliency impart a force to the arm in the opposite direction) results in the controlled oscillation of the mirror. By controlling or adjusting the pulse width and/or magnitude of the current pulses provided to the motor one can control or adjust the velocity of the movement of the mirror 112.

The beam sweeping means 110 is mounted on a wall portion of the enclosure at the same elevation as the laser diode and associated focusing means so that the focused beam 60 is projected horizontally onto the oscillating mirror 112. The means for mounting the laser diode and associated focusing means comprises a printed circuit card 116 which is mounted within the bottom portion of the engine.

The engine 100 includes a beam folding system located downstream of the beam sweeping means 110 to fold the path of the beam within the enclosure. In so doing the enclosure can be made very compact in size, as described earlier, while enabling the production of a wide, linear, scan pattern which can be used to scan large (wide) bar codes located close to the window as well as small (narrow) bar codes located far from the window, all without the need for complex signal processing and/or decoding means. To accomplish that end the beam folding system comprises a pair of reflecting surfaces, each in the form of an elongate mirror. In particular, a first mirror 118 is mounted on the interior surface of the enclosure's front wall at the same elevation as the oscillating mirror 112. The mirror 118 extends a substantial portion of the width of the front wall and includes a planar reflecting surface tilted upward at a slight acute angle, e.g., 4.8 degrees. Accordingly, the focused beam 60 is swept horizontally through the enclosure from an origin point (the point at which the focused beam impinges the oscillating mirror 112) to the upwardly angled reflecting surface of the mirror 118. The mirror 118 serves to reflect the swept beam (the line forming pattern 22) to another mirror 120 of the beam folding system. The mirror 120 is mounted on the inner surface of the enclosure's rear wall 102B at the same elevation as the window 104. The mirror 120 extends an even greater portion of the width of the enclosure than mirror 218 and includes a planar reflecting surface which is tilted downward at a slight acute angle, e.g., 4.8 degrees. Accordingly, the mirror 120 reflects the swept beam received from the mirror 118 horizontally through the enclosure to the window 104, from which it exits through the housing's opening 50 to sweep across a bar code located opposite the window.

The traversal of the laser beam across the bar code symbol illuminates the symbol, whereupon light is reflected omnidirectionally off of the symbol. A portion of the reflected light, representative of the bars and spaces of the code, enters the window 104. The received light passes through the enclosure onto mirror 120 where it is reflected downward across the enclosure to mirror 118. Mirror 118 in turn reflects the incoming light horizontally to the oscillating mirror 112, from whence it is directed horizontally to a collecting mirror 122. The collecting mirror 122 is mounted in the enclosure directly in front of the beam focusing means 108. Thus, the collecting mirror includes an opening 124 through which the focused laser beam 54 passes enroute to the beam sweeping mirror 112.

The collecting mirror 122 basically comprises a concave, e.g., spherical, parabolic, etc., reflective surface for focusing the received light onto a conventional light-to-electrical transducer, e.g., phototransistor, 126. The phototransistor 126 is also mounted on the circuit board 116 in the enclosure opposite to the collecting mirror 122. Accordingly, light received by the phototransistor is converted into an electrical signal indicative of the bars and spaces of the symbol scanned. The phototransistor is coupled to conventional signal processing means (not shown) including a preamplifier, amplifier, and digitizer circuitry mounted on the circuit board 116. That circuitry produces the heretofore mentioned digital output signals, and such signals are provided via the cable 40 and associated connector 38 to the decoder circuit board 32 located within the housing's hand-grip portion 26. The decoded signals are provided to the interface card which establish the desired protocol for communication with the peripheral device (not shown) via output cable 42.

As is conventional in order to initiate the operation of the scanner, i.e., cause it to project the scan pattern 22 out of it to sweep across a bar code at which the scanner's body portion is aimed, the scanner includes a manually actuatable member 62. In the preferred embodiment shown herein the member comprises a spring biased button which is located on the hand-grip portion adjacent the underside of the body portion. Thus, the operator, when holding the scanner in his/her hand and directing its body portion to the symbol to be scanned can readily depress the button 62 to initiate the scanning operation. The details of the button, its associated components and operation is conventional and thus will not be discussed further.

It should be pointed out at this juncture that other types of laser beam generating devices can be used in lieu of the semiconductor laser diode described heretofore. Moreover, other beam sweeping means can be utilized to produce the scan pattern, and that pattern need not consist of only a single line.

In view of the foregoing it should be appreciated by those skilled in the art that scanners constructed in accordance with the teachings of this invention can be assembled quickly, easily, and at relatively low cost. Moreover the resulting scanner while being extremely compact in size and low in weight is nevertheless quite effective for scanning of up close or far away symbols, be they larger or small.

The modular nature of the scanning and signal processing components and the construction of the housing facilitates servicing of the scanner. In this connection access to the interior of the device can be readily effected by separating the two housing sections 24A and 24B from each other. Thus, the servicing and/or replacement of any of the components located within cavity 30, e.g., the two printed circuit cards 32 and 34, can be accomplished easily and without disturbing the optical components of the device (those components being located within the scanner module 100). So too, the scanner module, which is releasably located within cavity 46 can be readily removed for servicing/replacement without disturbing the components within the hand-grip portion of the scanner. In either case all that is required for servicing/replacement of the scanner's components is to disassemble the housing to provide access to its interior and to then disconnect the electrical and/or mechanical connectors for the component(s) to be serviced or replaced.

Without further elaboration the foregoing will so fully illustrate my invention that others may, by applying current or future knowledge, readily adapt the same for use under various conditions of service.

I claim:

1. A hand-held laser scanner comprising a housing having a hand grip portion and a body portion projecting at an angle to said hand grip portion and having a forward free end, said body portion including a chamber in which an integral scanning module is located, said module being releasable securable in said chamber and comprising an enclosure having a window, which when the module is disposed within said chamber is located at said free end of said body portion, said module also comprising beam sweeping means for sweeping a laser beam from a predetermined point within said enclosure through a predetermined angle to produce a scan pattern comprising at least one line, and beam folding means projecting the scan pattern out of said window, said beam folding means being located between said beam sweeping means and said window for folding the path of the swept beam within said housing, said module also comprising output conductor means for carrying a signal indicative of the symbol scanned to circuit means located within said hand-grip portion of said scanner.

2. The scanner of claim 1 wherein said body portion includes a top wall portion and an end wall portion wherein said scan pattern is projected out of said end wall portion immediately below said top wall portion, so that the line of sight of the user to said symbol is not blocked by said housing.

3. The scanner of claim 1 wherein said housing is formed of at least two components which can be readily secured together to complete the assembly of said housing with said module and said decoding means disposed therein.

4. The scanner of claim 3 wherein said body portion includes a top wall portion and an end wall portion wherein said scan pattern is projected out of said end wall portion immediately below said top wall portion, so that the line of sight of the user to said symbol is not blocked by said housing.

5. The scanner of claim 1 wherein said housing is molded of a plastic material.

6. The scanner of claim 5 wherein said housing comprises securement means for releasably supporting said scanner on a support structure.

7. The scanner of claim 6 wherein said securement means comprises a member projecting downward from said body portion of said housing.

8. The scanner of claim 1 wherein said circuit means comprise decoding means comprising a printed circuit card, said card being releasably secured within said hand-grip portion of said housing.

9. The scanner of claim 8 additionally comprising interface means for connecting said scanner to a peripheral device.

10. The scanner of claim 9 wherein said interface means comprises a printed circuit card, said card being releasably secured within said hand-grip portion of said housing.

11. The scanner of claim 10 wherein said printed circuit cards are disposed on top of each other and are releasably secured together and to said housing.

12. The scanner of claim 11 wherein said housing is formed of at least to components which can be readily secured together to complete the assembly of said housing with said module and said decoding means disposed therein.

13. The scanner of claim 12 wherein said housing is molded of a plastic material.

14. The scanner of claim 13 wherein said body portion includes a top wall portion and an end wall portion wherein said scan pattern is projected out of said end wall portion immediately below said top wall portion, so that the line of sight of the user to said symbol is not blocked by said housing.

15. The scanner of claim 1 additionally comprising interface means for connecting said scanner to a peripheral device.

16. The scanner of claim 15 wherein said interface means comprises a printed circuit card, said card being releasably secured within said hand-grip portion of said housing.

17. The scanner of claim 1 wherein said housing comprises securement means for releasably supporting said scanner on a support structure.

18. The scanner of claim 17 wherein said securement means comprises a member projecting downward from said body portion of said housing.

19. The scanner of claim 1 additionally comprising actuatable means mounted on said hand-grip portion for effecting the intiation of a scanning operation.

20. The scanner of claim 19 wherein said actuatable means comprises a button.

* * * * *